(12) United States Patent
Cotnoir

(10) Patent No.: US 10,974,573 B2
(45) Date of Patent: Apr. 13, 2021

(54) WINDOW FRAME ASSEMBLY, DOOR ASSEMBLY AND WINDOW FRAME KIT FOR A VEHICLE

(71) Applicant: BOMBARDIER RECREATIONAL PRODUCTS INC., Valcourt (CA)

(72) Inventor: Doumik Cotnoir, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 75 days.

(21) Appl. No.: 16/519,417

(22) Filed: Jul. 23, 2019

(65) Prior Publication Data

US 2020/0346526 A1 Nov. 5, 2020

Related U.S. Application Data

(60) Provisional application No. 62/840,885, filed on Apr. 30, 2019.

(51) Int. Cl.
*B60J 1/08* (2006.01)
*B60J 1/14* (2006.01)
*B60R 21/13* (2006.01)
*B60J 5/04* (2006.01)

(52) U.S. Cl.
CPC .............. *B60J 1/085* (2013.01); *B60J 1/14* (2013.01); *B60J 5/0487* (2013.01); *B60R 21/13* (2013.01)

(58) Field of Classification Search
CPC ....... B60J 1/085; B60J 1/14; B60J 1/17; B60J 5/0487; B60J 5/0406; B60R 21/13
USPC ...... 296/190.03, 146.1, 146.5, 146.11, 146.2
See application file for complete search history.

(56) References Cited

U.S. PATENT DOCUMENTS

| | | | | |
|---|---|---|---|---|
| 4,070,056 | A * | 1/1978 | Hickman | B60J 5/0487 296/148 |
| 5,393,118 | A * | 2/1995 | Welborn | B60J 5/0487 280/DIG. 5 |
| 9,856,683 | B1 * | 1/2018 | Borth | B60J 5/0487 |
| 10,836,241 | B2 * | 11/2020 | Spitsnogle | B60J 5/0415 |
| 2015/0343900 | A1 * | 12/2015 | Schlangen | B62D 33/06 180/247 |
| 2017/0203640 | A1 * | 7/2017 | Rafeld | B60J 5/0487 |
| 2017/0247058 | A1 * | 8/2017 | Hokes | B60R 21/06 |
| 2018/0229591 | A1 | 8/2018 | Mazzarelli et al. | |
| 2019/0329633 | A1 * | 10/2019 | Hisamura | B60J 5/0415 |
| 2019/0346526 | A1 * | 11/2019 | Wenzel | G06T 7/30 |
| 2020/0207192 | A1 * | 7/2020 | Osorio | E05D 7/00 |

* cited by examiner

*Primary Examiner* — Gregory A Blankenship
(74) *Attorney, Agent, or Firm* — BCF LLP

(57) ABSTRACT

A window frame assembly for a vehicle has a cage frame segment connectable to a roll cage, a door frame segment connectable to a door having a hinged end and an opening end such that its first end is disposed proximate the opening end and its second end is disposed proximate the hinged end, and a linking frame segment having a first end pivotable about a pivot axis for pivoting the linking and door frame segments relative to the cage frame segment and a second end movably connected to the door frame segment such that the linking frame segment moves relative to the door frame segment as the linking and door frame segments pivot about the pivot axis, the cage, door and linking frame segments together forming a frame. Door assemblies for vehicles, window frame kits for vehicles, and vehicles provided with same are also disclosed.

23 Claims, 10 Drawing Sheets

WINDOW FRAME ASSEMBLY, DOOR ASSEMBLY AND WINDOW FRAME KIT FOR A VEHICLE

CROSS-REFERENCE

The present application claims priority to U.S. Provisional Patent Application No. 62/840,885, filed Apr. 30, 2019, the entirety of which is incorporated herein by reference.

FIELD OF TECHNOLOGY

The present technology relates to window frame assemblies for vehicles, door assemblies for vehicles, window frame kits for vehicles, and to vehicles provided with same.

BACKGROUND

Side-by-side vehicles (SSVs) are four-wheeled vehicles designed for off-road use. They have a driver seat and a passenger seat disposed side-by-side inside an interior area (i.e. cockpit area, cabin area) defined in part by a vehicle frame and a roll cage. SSVs also define access passages for permitting onboarding and deboarding of the driver and passenger(s). Some SSVs have half doors (i.e., doors sized for covering a bottom portion of the access passages) to selectively and partially close such access passages. Some such SSVs also have window assemblies connected to the doors to selectively and fully close such access passages. Some window assemblies have a window frame with a flexible window panel mounted thereto.

In some implementations of SSVs and other vehicles with half doors, the roll cage is structured such that top portions of the access passages extend rearward of the hinged sides of the doors, resulting in top portions of the access passages being longer than their respective bottom portions. Such configurations are deemed to facilitate ingress and egress of the SSV, as well as providing improved visibility for the driver and passengers sitting in the vehicle. In some such implementations, window frame assemblies are sized accordingly so as to selectively and fully close such access passages. In such implementations, for a given access passage, the window frame assembly connects to both the door and to a portion of the roll cage outward of the hinged side of the door. As a result, the window frame assembly is split into two portions hingedly connected to each other, one being fixed to the roll cage and the other being fixed to the door.

While this solution provides an overall desirable balance between visibility and protection, this solution also creates a notable inconvenience in the case of rear-hinged doors, wherein ingress is impeded as users leaning into the access passage toward the interior area must do so with their head above the bottom portion of the access passage so as to dodge the portion of the window assembly having remained fixed to the roll cage. Attempts have been made to address this issue by arranging the window frame assembly such that the hinged connection between its two portions is disposed outward of the hinged side of the door. However, due to this arrangement, opening the door causes portions of the window frame assembly respectively connected to the door and to the roll cage to pivot eccentrically relative to one another, subjecting the window frame assembly to stress.

There is therefore a desire for a window frame assembly for a vehicle which can connect to the door and window frame while addressing at least some of the issues described above.

SUMMARY

It is an object of the present technology to ameliorate at least some of the inconveniences present in the prior art.

According to one aspect of the present technology, there is provided a window frame assembly for a vehicle comprising a cage frame segment adapted for connection to a roll cage of the vehicle. The cage frame segment has a first cage frame segment end and a second cage frame segment end opposite the first cage frame segment end. A door frame segment is adapted for connection to a door of the vehicle. The door has a hinged end and an opening end opposite the hinged end. The door frame segment has a first door frame segment end and a second door frame segment end opposite the first door frame segment end. The door frame segment is adapted for connection to the door such that the first door frame segment end is disposed proximate the opening end of the door and the second door frame segment end is disposed proximate the hinged end of the door. A linking frame segment has a first linking frame segment end pivotable relative to the second cage frame segment end about a pivot axis for pivoting the linking frame segment and the door frame segment relative to the cage frame segment and a second linking frame segment end opposite the first linking frame segment end. The second linking frame segment end is movably connected to the first door frame segment end such that the second linking frame segment end moves relative to the first door frame segment end as the linking frame segment and the door frame segment pivot about the pivot axis. The cage frame segment, the door frame segment and the linking frame segment together form a window frame of the window frame assembly.

In some embodiments, the first linking frame segment end is pivotally connected to the second cage frame segment end about the pivot axis.

In some embodiments, the window frame assembly further comprises a window panel connected to the window frame.

In some embodiments, the window panel has a central panel portion disposed on an outer side of the window frame and a peripheral panel portion disposed at least in part around the central panel portion. The peripheral panel portion connects the window panel to the window frame.

In some embodiments, the pivot axis is a first pivot axis, and the second linking frame segment end is pivotally connected to the first door frame segment end about a second pivot axis such that the linking frame segment pivots relative to the door frame segment about the second pivot axis as the linking frame segment and the door frame segment pivot about the first pivot axis.

In some embodiments, the window frame assembly further comprises a joint connector pivotally connecting the second linking frame segment end to the first door frame segment end. The joint connector defines the second pivot axis.

In some embodiments, the second linking frame segment end is slidably connected to the first door frame segment end such that the linking frame segment slides along the second pivot axis relative to the door frame segment as the linking frame segment and the door frame segment pivot about the first pivot axis.

In some embodiments, the window frame assembly further comprises a joint connector pivotally and slidably connecting the second linking frame segment end to the first door frame segment end. The joint connector defines the second pivot axis.

In some embodiments, the peripheral panel portion forms a sleeve, and at least one of the door frame segment, the cage frame segment and the linking frame segment is received in the sleeve for connecting the window panel to the window frame.

In some embodiments, the cage frame segment is generally C-shaped, the door frame segment is generally L-shaped and the linking frame segment is generally L-shaped.

In some embodiments, the cage frame segment defines a first vertical portion of the window frame, the door frame segment defines at least in part a lower portion of the window frame, the linking frame segment defines at least in part an upper portion of the window frame, the linking frame segment and the door frame segment define at least in part a second vertical portion of the window frame, the second vertical portion of the window frame being opposite the first vertical portion of the window frame, and a connection between the second linking frame segment end and the first door frame segment end is in the second vertical portion of the window frame.

In some embodiments, the window frame assembly further comprises a support connected to the door frame segment for selectively connecting the window frame assembly to the door.

In some embodiments, the second door frame segment end moves relative to the first cage frame segment end as the door frame segment pivots about the pivot axis. The second door frame segment end is spaced from the first cage frame segment end.

In some embodiments, the cage frame segment is adapted for connection to the roll cage of the vehicle such that the first pivot axis is disposed outwardly of the hinged end of the door. The hinged end of the door is pivotally connected to a frame of the vehicle for pivoting the door about a hinge axis relative to the frame. The first pivot axis is offset from the hinge axis.

According to another aspect of the present technology, a door assembly for a vehicle comprises a door adapted for connection to a frame of the vehicle. The door has a hinged end for hingedly connecting the door to the frame of the vehicle and an opening end opposite the hinged end. A cage frame segment is adapted for connection to a roll cage of the vehicle. The roll cage is connected to the frame. The cage frame segment has a first cage frame segment end and a second cage frame segment end opposite the first cage frame segment end. A door frame segment is connected to the door. The door frame segment has a first door frame segment end and a second door frame segment end opposite the first door frame segment end. The door frame segment is disposed relative to the door such that the first door frame segment end is disposed proximate the opening end of the door and the second door frame segment end is disposed proximate the hinged end of the door. A linking frame segment has a first linking frame segment end pivotable relative to the second cage frame segment end about a pivot axis for pivoting the linking frame segment and the door frame segment relative to the cage frame segment and a second linking frame segment end opposite the first linking frame segment end. The second linking frame segment end is movably connected to the first door frame segment end such that the second linking frame segment end moves relative to the first door frame segment end as the linking frame segment and the door frame segment pivot about the pivot axis. The cage frame segment, the door frame segment and the linking frame segment together form a window frame. A window panel is connected to the window frame.

In some embodiments, the first linking frame segment end is pivotally connected to the second cage frame segment end about the pivot axis.

In some embodiments, the pivot axis is a first pivot axis and the second linking frame segment end is pivotally connected to the first door frame segment end about a second pivot axis such that the linking frame segment pivots relative to the door frame segment about the second pivot axis as the linking frame segment and the door frame segment pivot about the first pivot axis.

In some embodiments, the second linking frame segment end is slidably connected to the first door frame segment end such that the linking frame segment slides along the second pivot axis relative to the door frame segment as the linking frame segment and the door frame segment pivot about the first pivot axis.

According to another aspect of the present technology, a window frame assembly kit for a vehicle comprises a cage frame segment, a door frame segment and a linking frame segment. The linking frame segment is connectable to the cage frame segment and to the door frame segment for forming a window frame. The cage frame segment has a first cage frame segment end and a second cage frame segment end opposite the first cage frame segment end. The cage frame segment is adapted for connection to a roll cage of the vehicle. The door frame segment has a first door frame segment end and a second door frame segment end opposite the first door frame segment end. The door frame segment is adapted for connection to a door of the vehicle. The door has a hinged end and an opening end opposite the hinged end, such that the first door frame segment end is disposed proximate the opening end of the door and the second door frame segment end is disposed proximate the hinged end of the door. A linking frame segment has a first linking frame segment end pivotable relative to the second cage frame segment end about a pivot axis for pivoting the linking frame segment relative to the cage frame segment and a second linking frame segment end opposite the first linking frame segment end. The second linking frame segment end is movably connectable to the first door frame segment end such that the second linking frame segment end is movable relative to the first door frame segment end. Pivotally connecting the first linking frame segment end to the second cage frame segment end and connecting the second linking frame segment end to the first door frame segment end forms the window frame.

In some embodiments, the first linking frame segment end is pivotally connectable to the second cage frame segment end about the pivot axis.

In some embodiments, the window frame assembly kit further comprises a window panel connectable to the window frame.

In some embodiments, the window frame assembly kit further comprises a joint connector defining the pivot axis. The joint connector is adapted for pivotally connecting the second linking frame segment end to the first door frame segment end such that the linking frame segment is pivotable about the pivot axis relative to the door frame segment.

In some embodiments, the window frame assembly kit further comprises a joint connector defining the pivot axis. The joint connector is adapted for pivotally and slidably connecting the second linking frame segment end to the first door frame segment end such that the linking frame segment is pivotable about the pivot axis and is slidable along the pivot axis relative to the door frame segment.

In some embodiments, the window frame assembly kit further comprises a support connectable to the door frame segment for selectively connecting the window frame to the door.

According to another aspect of the present technology, a vehicle comprises a frame, a roll cage connected to the frame and a door having a hinged end and an opening end opposite the hinged end. The hinged end is pivotally connected to the frame for pivoting the door about a hinge axis relative to the frame and to the roll cage. A cage frame segment is connected to the roll cage. The cage frame segment has a first cage frame segment end and a second cage frame segment end opposite the first cage frame segment end. A door frame segment is connected to the door. The door frame segment has a first door frame segment end and a second door frame segment end opposite the first door frame segment end. The door frame segment is disposed relative to the door such that the first door frame segment end is disposed proximate the opening end of the door and the second door frame segment end is disposed proximate the hinged end of the door. The door frame segment is disposed on a first side of a laterally extending plane defined by the hinge axis. The cage frame segment is disposed at least in part on a second side of the laterally extending plane. The second side is opposite the first side. A linking frame segment has a first linking frame segment end pivotable relative to the second cage frame segment end about a pivot axis for pivoting the linking frame segment and the door frame segment relative to the cage frame segment as the door pivots about the hinge axis. The pivot axis is offset from the hinge axis. A second linking frame segment end is opposite the first linking frame segment end. The second linking frame segment end is movably connected to the first door frame segment end such that the second linking frame segment end moves relative to the first door frame segment end as the linking frame segment and the door frame segment pivot about the pivot axis as the door pivots about the hinge axis. The cage frame segment, the door frame segment and the linking frame segment together form a window frame. A window panel is connected to the window frame.

In some embodiments, the first linking frame segment end is pivotally connected to the second cage frame segment end about the pivot axis.

For purposes of this application, terms related to spatial orientation such as forward, rearward, upward, downward, left, and right, are as they would normally be understood by a driver of the vehicle sitting thereon in a normal driving position.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
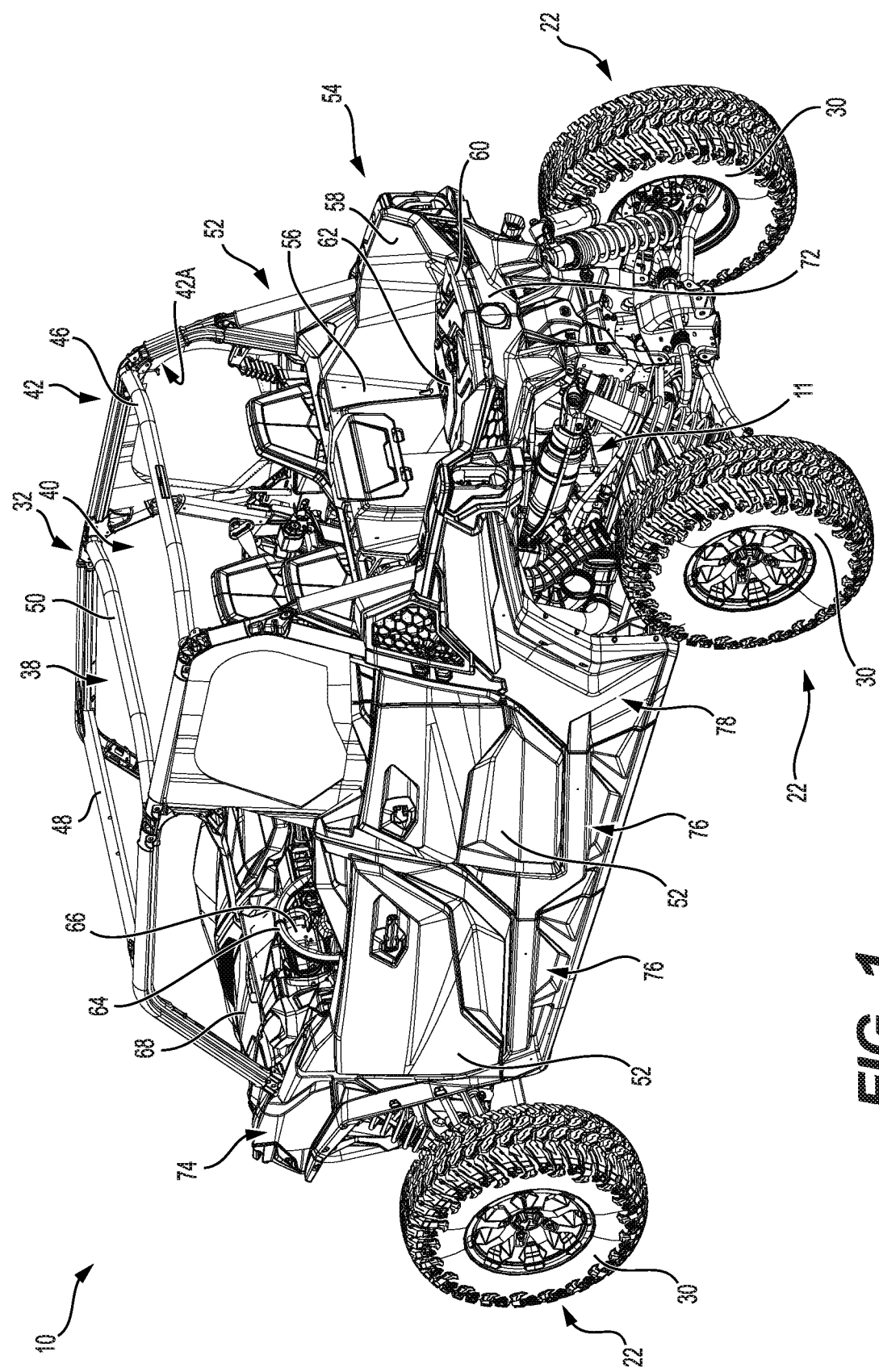
FIG. 1 is a top, rear, left side perspective view of a side-by-side vehicle, with doors of the vehicle being closed, the rear left and rear right doors having a window frame assembly according to aspects of the present technology.

The present technology will be described herein with respect to off-road, side-by-side vehicles. It is contemplated that aspects of the present technology could also be applied to other types of vehicles having doors.

The general construction of a side-by-side vehicle (SSV) 10 will be described with respect to FIGS. 1 and 2. The following description relates to one way of manufacturing a vehicle such as the SSV 10. Those of ordinary skill in the vehicle art should recognize that there are other known ways of manufacturing and designing vehicles such as the SSV 10 and that these are contemplated.

The SSV 10 has a front end 12, a rear end 14, and two lateral sides 16 (left and right). The SSV 10 includes a vehicle frame 18. The vehicle frame 18 is a load-bearing structure that contributes to the SSV 10 withstanding typical loading conditions typically encountered during its operation. The vehicle frame 18 includes a plurality of frame members welded or fastened together. It is also contemplated that at least some of the frame members could be joined together in a multitude of alternate manners. A front pair 20 of wheels 22 is suspended from the front portion of the vehicle frame 18 via front suspension assemblies 24. A rear pair 26 of wheels 22 is suspended from the rear portion of the vehicle frame 18 via rear suspension assemblies 28. Each of the four wheels 22 has a tire 30.

Figure 5:
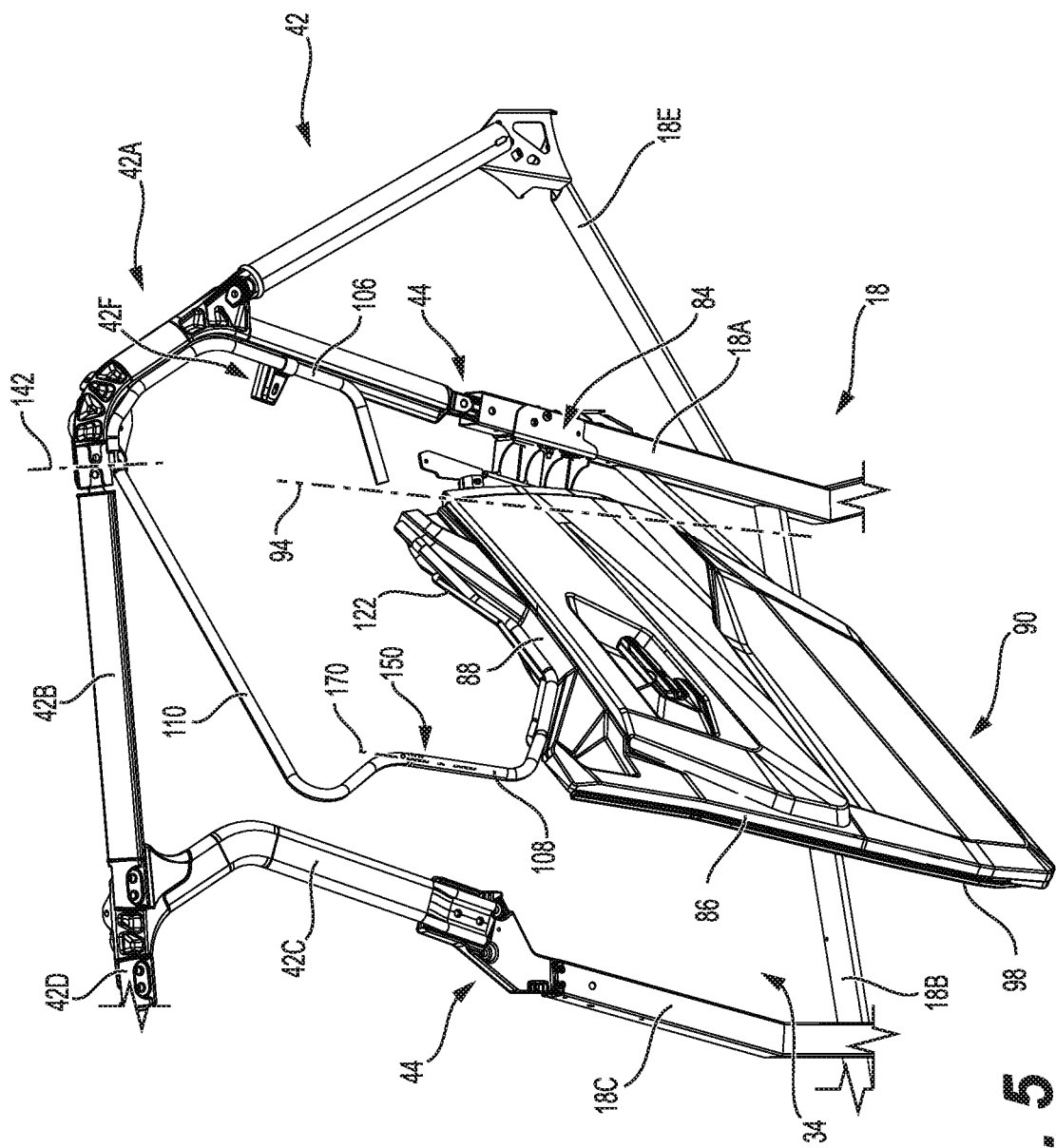
FIG. 5 is a close-up, top, front, left side perspective view of the vehicle of FIG. 1, with a window panel of the rear, left window frame assembly and portions of the vehicle being removed and with the rear, left door in an open position.

An interior area 32 of the SSV 10 is disposed onto a middle portion of the vehicle frame 18. The interior area 32 extends laterally between left (18A, 18B, 18C FIG. 5) and right lateral frame members of the vehicle frame 18. As seen in FIG. 5, the left lateral frame members 18A, 18B and 18C, form an inverted arch-shaped structure extending toward an underside of the SSV 10. The frame member 18A is a rear frame pillar 18A. The frame member 18C is a central frame pillar 18C disposed forward of the rear frame pillar 18A. The frame member 18B is a longitudinal frame beam 18B and extends forwardly from the rear frame pillar 18A to forward of the central frame pillar 18C. The rear and central pillars 18A, 18C extend from the longitudinal frame beam 18B, together defining a rear, left access passage 34 providing access to the interior area 32. A front frame pillar (not shown in detail) is disposed forward of the central frame pillar 18C. The longitudinal frame beam 18B extends forwardly from the central frame pillar 18C to the front frame pillar 18A. The front pillar and the central frame pillar 18C extend from the longitudinal frame beam 18B, together defining a front, left access passage 34 providing access to the interior area 32. It should be noted that the front and rear right access passages 34 are defined by the vehicle frame 18 opposite the front and rear left access passages 34, respectively. Two front and two rear seats 36 are connected to the middle portion of the vehicle frame 18. Each seat 36 is a bucket seat having a seat base 36A and a backrest 36B. Each backrest 36B incorporates a headrest. It is contemplated that the seats 36 could be other types of recumbent seats or bench seats. Each seat 36 is also provided with a seat belt 36C. The two front seats 36 are disposed side-by-side between the front access passages 34, forming a front seating row. The two rear seats 36 are disposed side-by-side between the rear access passages 34 and rearward of the front seats 36, forming a rear seating row. The front and rear seating rows are disposed in a cockpit area 38 and a cabin area 40 of the interior area 32, respectively.

A roll cage 42 is connected to the vehicle frame 18 and is disposed above the interior area 32. The roll cage 42 includes a plurality of cage members. The cage members of the roll cage 42 are fastened together so as to form a modular structure. It is also contemplated that at least some of the cage members could be joined together in a multitude of alternate manners, including but not limited to, by welding, so as to form an integral structure. The interior area 32 extends laterally between left and right lateral cage members of the roll cage 42. The left lateral cage members includes a rear cage pillar 42A, a rear longitudinal cage beam 42B, a central cage pillar 42C, a front longitudinal cage beam 42D and a front cage pillar 42E (FIG. 2). The rear cage pillar 42A is formed by two members connected to one another, although it could be integral. The rear, central and front cage pillars 42A, 42C, 42E extend away from the vehicle frame 18. The roll cage 42 is joined to the vehicle frame 18 via several connecting points. The rear and central cage pillars 42A, 42C are respectively connected to the rear and central frame pillars 18A, 18D via cage mounting connectors 44. The rear and central cage pillars 42A, 42C extend from the cage mounting connectors 44 to the rear longitudinal cage beam 42B. The left lateral cage members 42A, 42B and 42C together form a rear left arch extending above the rear left access passage 54. Similarly, the left lateral cage members 42C, 42D and 42E form a front left arch extending above the front left access passage 54. On the right side of the SSV 10, front and rear right arches are formed opposite the front and rear left arches, respectively, by right lateral cage members of the roll cage 42. The roll cage 42 also includes a rear transverse cage beam 46, a front transverse cage beam 48 and a central transverse cage beam 50 respectively disposed above the interior area 32. The rear transverse cage beam 46 extends laterally between the rear left and right cage pillars 42A. The front transverse cage beam 48 extends laterally between the front left and right cage pillars 42E. The central transverse cage beam 50 extends laterally between the central left and right cage pillars 42C. The cockpit area 38 and the cabin area 40 extend respectively forwardly and rearwardly of the central transverse cage beam 50. It is contemplated that in some implementations, the cabin area 40 could be omitted. Accordingly, in such implementations, the rear seating row is omitted.

In the present embodiment, doors 52 are hingedly connected to lateral frame pillars of the vehicle frame 18 so as to selectively close the four access passages 34. The rear left and right doors 52 are pivotally mounted to the rear frame pillars 18A about hinge axes 94 so as to be pivoted relative to the vehicle frame 18 SSV 10 between a closed position and a range of open positions. In FIG. 2, the rear left door 52 is shown pivoted in a partially open position of the range of open positions. In FIG. 2, the rear right door 52 is shown in the closed position. As can be seen, the hinge axes 54 are located at the rear of the rear doors 52. The riders can ingress and egress the SSV 10 via the access passages 34 when the doors 52 are open. A window frame assembly 100 is connected to each of the rear doors 52. Each rear door 52 and its corresponding window frame assembly 100 together form a door assembly. Specifics of the window frame assembly 100 will be described in more detail below. The front left and right doors 52 are pivotally mounted to the front frame pillars about hinge axes (not shown) so as to be pivoted relative to the vehicle frame 18 SSV 10 between a closed position and a range of open positions. The hinge axes of the front doors 52 are located at the front of the front doors 52. It is contemplated that the front doors 52 could also be provided with window frame assemblies similar to the window frame assemblies 100.

A cargo box 54 extends rearwardly of the interior area 32. It is contemplated that the cargo box 54 could be replaced by a cargo rack. In the present implementation, the cargo box 54 is fixed to the vehicle frame 18, but it is also contemplated that the cargo box 54 could be pivotally mounted to the vehicle frame 18. It is contemplated that in some implementations, the cargo box 54 could be omitted. The cargo box 54 has a front wall 56, two side walls 58, a rear wall 60 and a floor 62. As seen in FIG. 1, the rear wall 60 is lower than the side walls 58, thus facilitating access to the cargo space defined by the cargo box 54.

A steering device including a steering wheel 64 is disposed in the cockpit area 38 in front of the front left seat 36. It is contemplated that the steering wheel 64 could be disposed in front of the front right seat 36. The steering device is operatively connected to the two front wheels 22 to permit steering of the SSV 10. A display cluster 66 is disposed in front of the steering wheel 64. A throttle operator in the form of a throttle pedal (not shown) is disposed over the floor of the cockpit area 38 below the steering wheel 64.

The SSV 10 has a vehicle body mounted to the vehicle frame 18. The vehicle body includes a hood 68, a front body panel 70 (FIG. 2), a rear body panel 72 and a number of side body panels. The side body panels include front fenders 74, front and rear central panels 76 and rear fenders 78. It is contemplated that the hood 68, the front body panel 70, the rear body panel 72, the fenders 74, 78, and the lower central panels 76 could each be replaced by multiple panels. It is also contemplated that the vehicle body of the SSV 10 could have more or less body panels than described above.

Figure 2:
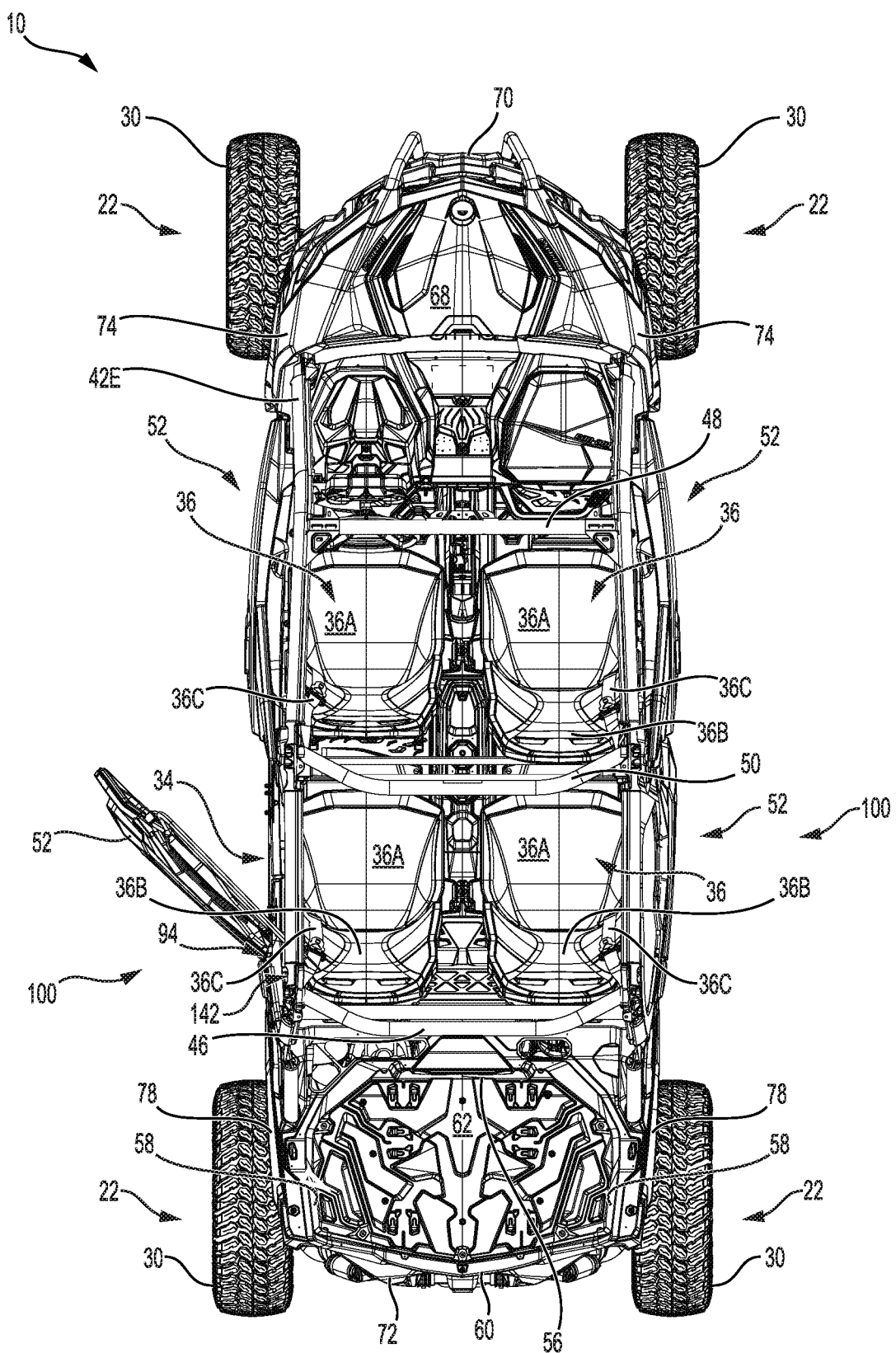
FIG. 2 is a top plan view of the vehicle of FIG. 1, with the rear, left door being in an open position.

The SSV 10 is powered by a motor, specifically an internal combustion engine 11 (FIG. 1). The engine 11 is disposed rearward of the interior area 32 below the cargo box 54. A firewall (not shown) is disposed between the interior area 32 and the engine 11. It is contemplated that the engine 11 could be replaced by a hybrid or electric motor in some implementations. The engine 11 is operatively connected to the wheels 22 to drive the wheels 22 in order to drive the SSV 10. It is also contemplated that only two of the four wheels 22 could be driven by the engine 11.

Turning now to FIGS. 3 to 6, the rear left window frame assembly 100 and the rear left door assembly including the rear left door 52 and the rear left door assembly 100 will be described in more detail. As the rear right window frame assembly 100 and the rear right door assembly including the rear right door 52 and the rear right door assembly 100 are mirror images of those of the left side of the SSV 10, they will not be described in detail herewith.

Figure 3:
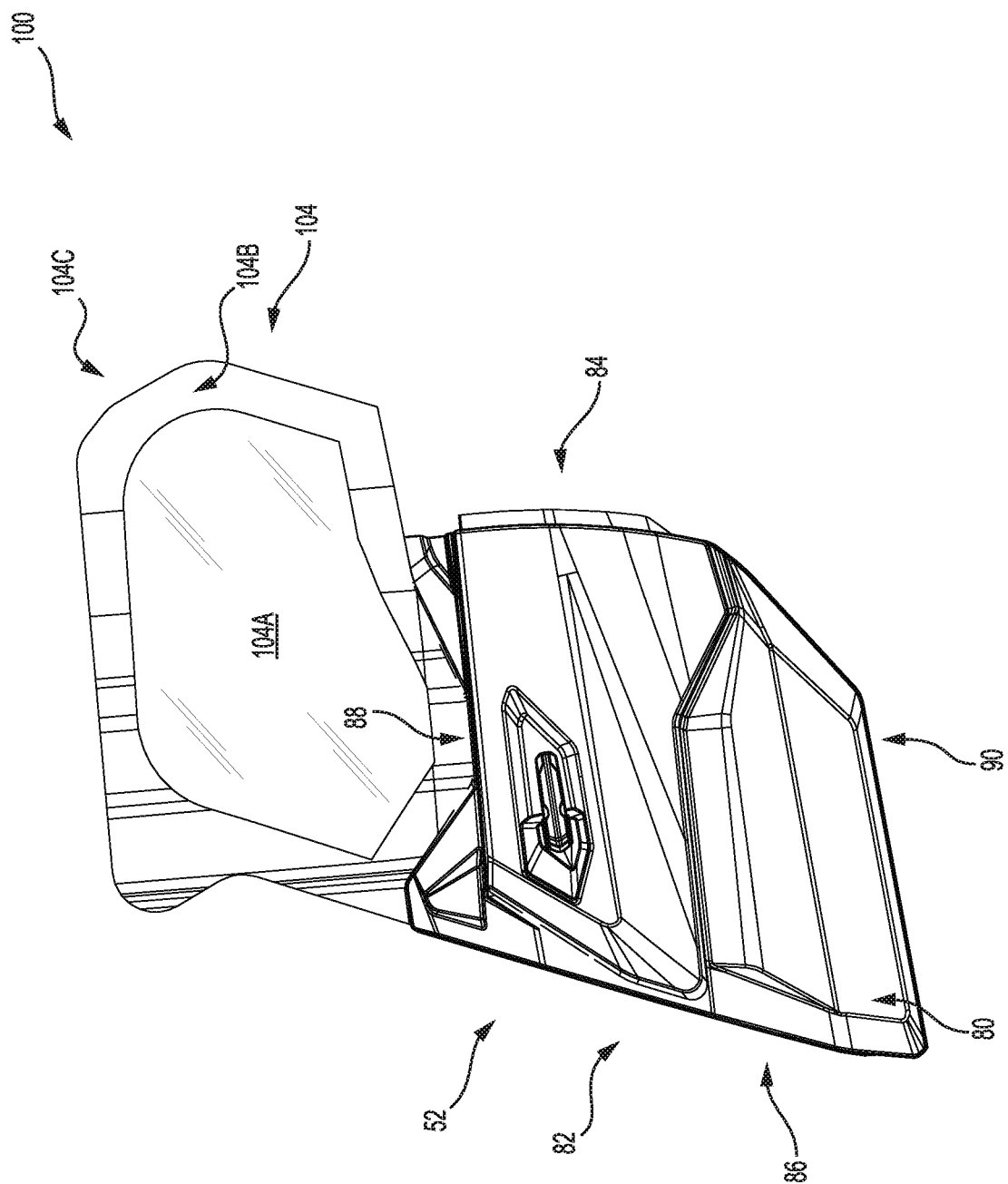
FIG. 3 is a left side elevation view of the rear, left door assembly of FIG. 1.
Figure 4:
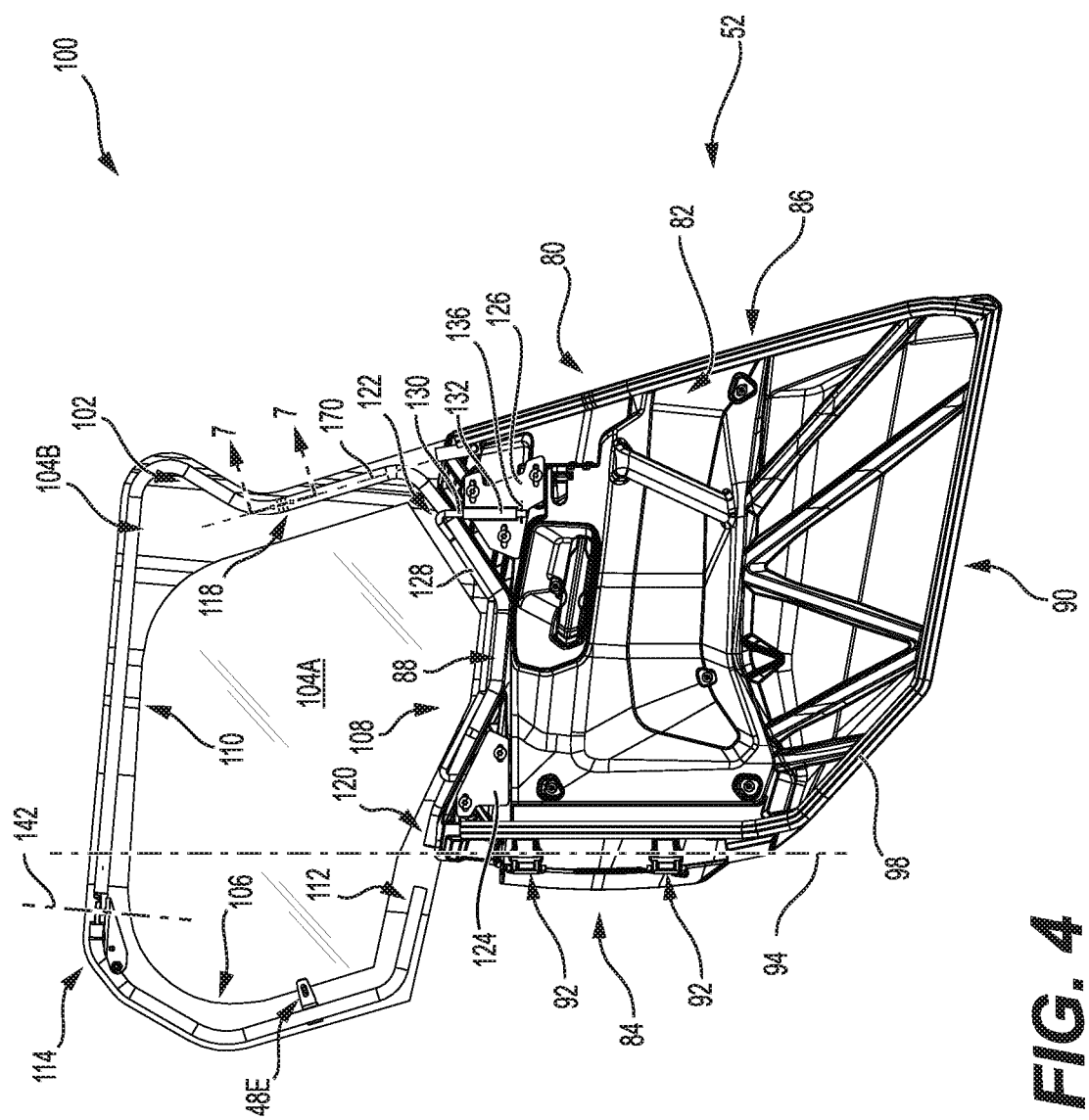
FIG. 4 is a right side elevation view of the door assembly of FIG. 1.

In FIGS. 3 and 4, the rear left door 52 and window frame assembly 100 are shown isolated from a remainder of the SSV 10. The door 52 has an exterior side 80 (best seen in FIG. 3) and an interior side 82 (best seen in FIG. 4) opposite the exterior side 80. The door 52 has a periphery defined by a hinged end 84, an opening end 86, a top end 88 and a bottom end 90. The opening end 86 opposes the hinged end 84 and the bottom end 90 opposes the top end 88.

Door hinge connectors 92 are disposed on the hinged end 84 of the door 52, thereby defining a hinge axis 94. The door hinge connectors 92 connect to vehicle hinge connectors (not shown) disposed on the rear frame pillar 18A facing the access passage 34. The vehicle hinge connectors are disposed coaxially with the hinge axis 94. The door 52 is pivotable about the hinge axis 94 via its door hinge connectors 92 relative to the vehicle frame 18. It should be noted that the rear doors 52 of the SSV 10 are rear-hinged, whereas the front doors 52 are front-hinged. It is contemplated that the doors 52 could be configured to hinge on the opposite side from what is shown herein.

A sealing strip 98 is disposed along an outer edge of the interior side 82 of the door 52. The sealing strip 98 has a first end disposed proximate the corner defined by the top end 88 and the hinged end 84. From its first end, the sealing strip 98 extends around the hinged end 84, the bottom end 90 and the opening end 86 to a second end disposed proximate the corner defined by the top end 88 and the opening end 86. The sealing strip 98 is constructed to be compressed against the vehicle frame 18 when the door 52 is in the closed position so as to hinder entrance of substances into the interior area 32 via the access passage 34. In the closed position, the top end 88 of the door 52 and the rear left arch of the roll cage 42 together form an aperture shielded by the window frame assembly 100.

Specifics of the rear, left window frame assembly 100 will now be described with respect to the rear left door 52 illustrated in more detail in FIGS. 3, 4 and 5.

The window frame assembly 100 comprises a window frame 102 and a window panel 104. The window frame 102 includes a plurality of frame segments connected to one another so as to form a perimeter having a shape corresponding to the aperture formed by the door 52 and the roll cage 42. Among its plurality of frame segments, the window frame 102 includes a cage frame segment 106 disposed alongside the roll cage 42 rearward of the hinge axis 94. The window frame 102 also includes a door frame segment 108 disposed alongside the top end 88 of the door 52, and a linking frame segment 110 linking the cage frame segment 106 to the door frame segment 108. The linking frame segment 110 interfaces with the door frame segment via a joint connector 150. The cage frame segment 106, the door frame segment 108 and the linking frame segment 110 all have the same tubular cross-sectional profile, although this does not have to be the case.

The window panel 104 is a flexible structure having a central panel portion 104A constructed of transparent or translucent material. In the present embodiment, the central panel portion 104A is made of clear plastic. The central panel portion 104A has a surface area and a shape sufficient to cover most of the area circumscribed by the window frame 102. The central panel portion 104A is surrounded by a peripheral panel portion 104B extending outward thereof. The peripheral panel portion has a shape that generally conforms to the top end 88 of the door 52 and to the upper arch of the roll cage 42 formed by cage members 42A, 42B and 42C. The window panel 104 also has an inner panel portion 104C (removed for clarity in FIG. 4, shown in FIG. 6) connected to the peripheral panel portion 104B so as to form a sleeve (not shown in detail). The sleeve is sized for receiving the plurality of segments of the window frame 102. The window panel 104 is connected to the window frame 102 via the sleeve. It should be noted that the sleeve is structured such that the window panel 104 can be connected to the window frame 102 with the window frame being already connected to the door 52, for example via clasp lockers (a.k.a. zippers, not shown) selectively defining openings along the inner panel portion 104C. Further, it should be noted that in some embodiments, the central panel portion 104A is arranged with zippers so as to be selectively detachable, at least in part, from the peripheral panel portion 104B.

The cage frame segment 106 has a cage frame segment end 112 disposed proximate the door 52 and a cage frame segment end 114 disposed opposite the cage frame segment end 112. The cage frame segment end 114 is disposed adjacent a rear end of the rear longitudinal cage beam 48B, as can be seen in FIG. 5. The cage frame segment 106 is generally C-shaped and espouses a shape of the rear cage pillar 42A. The cage frame segment 106 is fixedly joined to the rear cage pillar 42A via a clamp 42F. Other means for joining the cage frame segment 106 to the roll cage 42 are also contemplated. The cage frame segment end 112 hangs between the rear cage pillar 42A and the hinge axis 94. The cage frame segment end 114 terminates at a cage frame segment pivotable connector 116.

The door frame segment 108 has a door frame segment end 118 disposed at a front of the door 52, away from the top end 88 of the door 52 in a general alignment with its opening end 86. In the closed position, from the door frame segment end 118, the door frame segment 108 extends downward alongside the central cage pillar 48C. The door frame segment 108 has a door frame segment end 120 disposed inward of the hinged end 84 of the door 52. In this embodiment, the door frame segment 108 extends to forward of the hinge axis 94. In some embodiments, the door frame segment 108 extends to rearward of the hinge axis 94. From the door frame segment end 120, the door frame segment 108 extends forward, espousing the shape of the top end 88 of the door 52. As such, the door frame segment 108 is generally L-shaped. As can be seen in FIG. 4, the door frame segment end 120 is spaced from the cage frame segment end 112 when the door 52 is closed.

The door frame segment 108 is connected to the door 52 via a support 122 received in brackets 124, 126 mounted to the door 52. The support 122 has a generally M-shaped longitudinal support segment 128 extending between two transverse support segments 130. The longitudinal support segment 128 follows the shape of the longitudinal portion of the door frame segment 108. The support 122 is joined to the door frame segment 108 by welding, although other means for joining the support 122 to the door frame segment 108 are contemplated.

Figure 6:
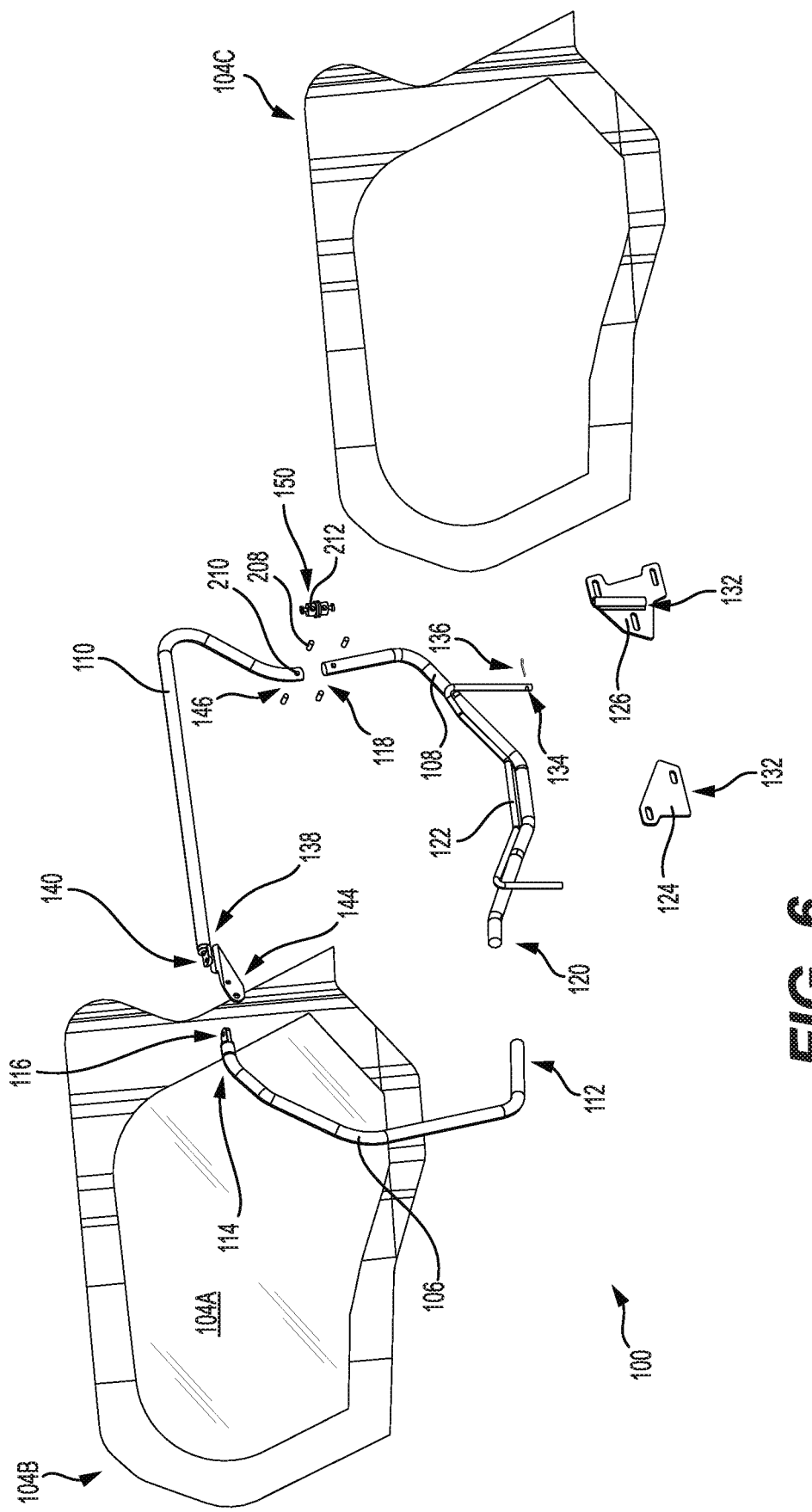
FIG. 6 is an exploded view of the rear, left window frame assembly of FIG. 3.

The brackets 124, 126 are fastened to the interior side 82 of the door 52 as best seen in FIG. 4. It is contemplated that the brackets 124, 126 could be connected to the door by other means, such as welding for example. The rear bracket 124 and the front bracket 126 include channels 132 sized for receiving the front and rear transverse support segments 130, respectively. The brackets 124, 126 are arranged relative to the door 52 such that the transverse support segments 130 can be received simultaneously by the channels 132 so as to connect the door frame segment 108 to the door 52. The transverse support segments 130 extend downwardly from the longitudinal support segment 128 into the channels 132. An end of the front transverse support segment 130 is disposed downward of the front channel 132 and defines an opening 134 (FIG. 6). An R-pin 136 engages the front transverse support segment 130 via its opening 134 such that disconnection of the door frame segment 108 from the door 52 is selectively hindered. It should be noted that the window frame assembly 100 is arranged so as to enable users to selectively disconnect the door frame segment 108 from the door 52 whenever desired, for example either from inside the SSV 10 when the door 52 is closed, or from outside the SSV 10 when the door 52 is open. Other connecting means for selectively connecting the door frame segment 108 to the door 52 are contemplated. In some embodiments, selectively detaching the central panel portion 104A from the peripheral panel portion 104B forms an opening via which the connecting means can be used from outside the SSV 10 to selectively disconnect the door frame segment 108 from the door 52.

The linking frame segment 110 has a linking frame segment end 138 disposed proximate the cage frame segment end 114. The linking frame segment end 138 has a linking frame segment pivotable connector 140 that is pivotably connected to the cage frame segment pivotable connector 116 about a pivot axis 142. The linking frame segment pivotable connector 140 permits pivoting the linking frame segment 110 relative to the roll cage 42 and to the cage frame segment 106. A bracket 144 pivotally connected to the linking frame segment end 138 is used to fasten the linking frame segment pivotable connector 140 to the roll cage 42 so as to support both the linking frame segment end 138 and the cage frame segment end 114. The linking frame segment pivotable connector 140 of the linking frame segment end 138 can be selectively disconnected from the cage frame segment pivotable connector 116 to disassemble the window frame assembly 100, as will be described in further detail herein below. It is contemplated that the linking frame segment end 138 could only be pivotably connected to the roll cage 42 and not the cage frame segment 106. Also, it is contemplated that the bracket 144 could be omitted. A linking frame segment end 146 of the linking frame segment 110 is disposed opposite its end 138. The linking frame segment 110 is generally L-shaped, which espouses a shape of the rear cage beam 48B and a shape of the central cage pillar 48C. The linking frame segment end 146 is connected to the door frame segment end 118 via the joint connector 150 so as to be movable relative to the door frame segment end 118, as will be described below.

Figure 7:
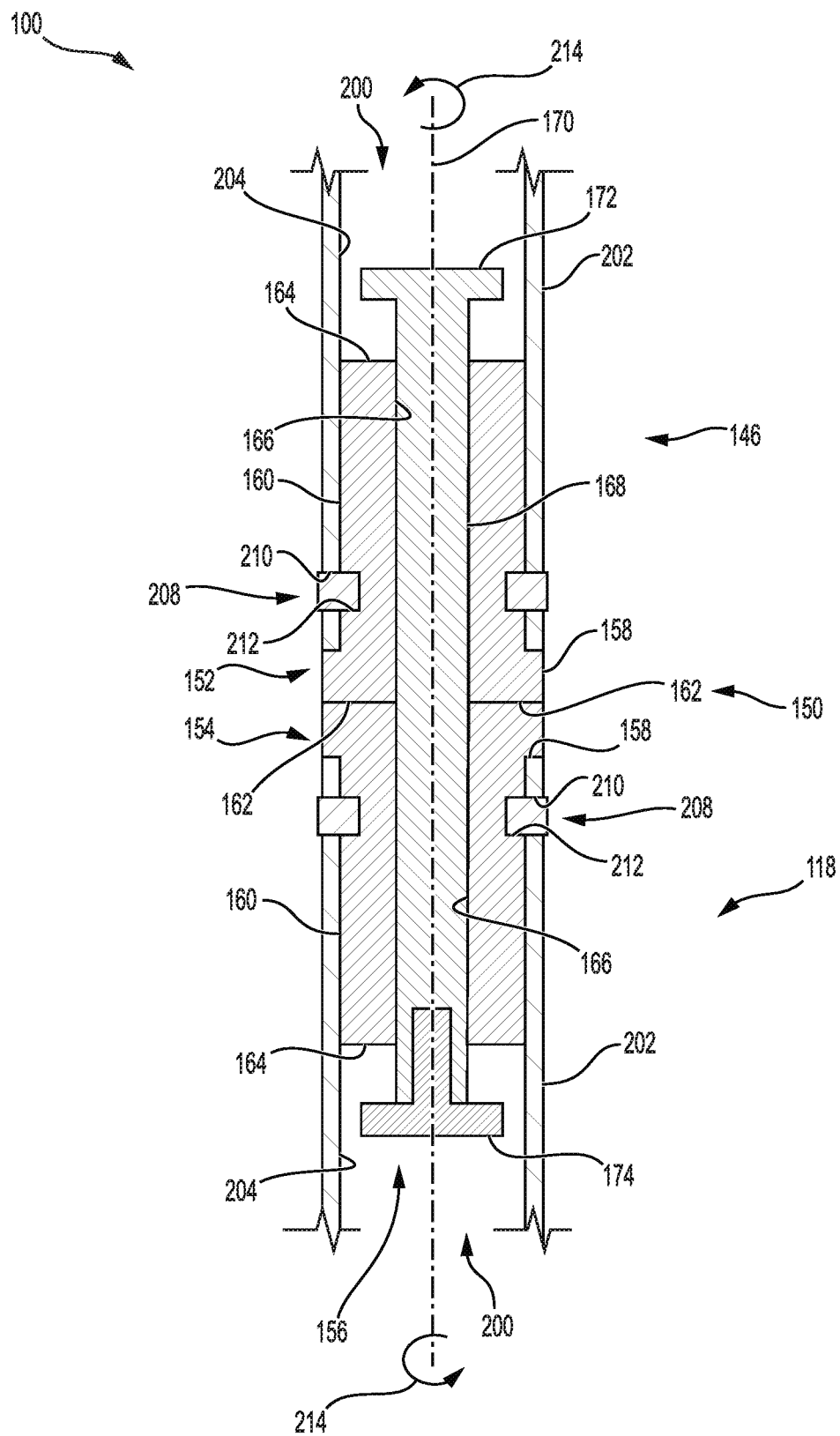
FIG. 7 is a cross-sectional view taken through line 7-7 of FIG. 4, with portions of the window frame assembly of FIG. 1 shown in a collapsed frame configuration.

Turning now to FIG. 7, the joint connector 150 will be described in more detail. The joint connector 150 includes a top joint connector segment 152, a bottom joint connector segment 154 and a joint pin 156. The top and bottom joint connector segments 152, 154 each have a flange portion 158 and a plug portion 160 projecting from the flange portion 158. Each joint connector segment 152, 154 extends from a distal surface 162 of its flange portion 158 to a proximal surface 164 of its plug portion 160. Collinear bores 166 are defined inside the joint connector segments 152, 154 between their respective distal surface 162 and proximal surface 164. The bottom and top joint connector segments 154, 152 are inserted in the door frame segment end 118 and the linking frame segment end 146, respectively. The flange portions 158 of the bottom and top joint connector segments 154, 152 abut against the door frame segment end 118 and the linking frame segment end 146, respectively. The plug portions 160 are fitted inside channels 200 defined inwardly of the door frame segment end 118 and the linking frame segment end 146. Fasteners 208 join the linking frame segment end 146 and the door frame segment end 118 to the top joint connector segment 152 and the bottom joint connector segment 154, respectively. The fasteners 208 extend through frame segment openings 210 defined by the segment ends 146, 118 and inside connector openings 212 defined by the top and bottom joint connector segments 152, 154, thereby holding the top and bottom joint connector segments 152, 154 in place. Various means for joining both the linking frame segment end 146 and the door frame segment end 118 to the joint connector 150 are contemplated.

The door frame segment end 118 and the linking frame segment end 146 have cylindrical outer walls 202 and inner walls 204 (defining the channels 200) with matching outer diameters and inner diameters. The flange portions 158 have outer diameters matching the outer diameters of the door frame segment end 118 and the linking frame segment end 146. The plug portions 160 have inner diameters matching the inner diameters of the door frame segment end 118 and the linking frame segment end 146. It is contemplated that the plug portions 160 and the channels 200 could have other complementary shapes.

The slidable pin 156 includes a pin shaft 168 extending along a joint pivot axis 170 between a pair of pin heads 172, 174. The pin shaft 168 is received in the bores 166. The pin shaft 168 has a diameter commensurate to a diameter of the bores 166 and has a length greater than a combined length of the bores 166 such that the top and bottom joint connector segments 152, 154 can slide along the joint pivot axis 170 relative to the pin shaft 168. In some embodiments, the pin shaft 168 and the top and bottom joint connector segments 152 are sized relative to one another such that sliding along the joint pivot axis 170 is minimized In some such embodiments, sliding of the top and bottom joint connector segments 152, 154 relative to the pin shaft 168 can occur due to their respective manufacturing tolerances. The pin heads 172, 174 are oversized relative to the bores 166 so as to retain the pin shaft 168 inside the bores 166. It should be noted that the slidable pin 156 is structured such that the bottom pin head 174 is detachable from the pin shaft 168 for the pin shaft 168 to be receivable by the top and bottom joint connector segments 152, 154 via the bores 166. With the joint connector segments 152, 154 disposed about the joint pivot axis 170 between the pin heads 172, 174, the top and bottom joint connector segments 152, 154 can be positioned in a collapsed joint position (shown in FIG. 7) in which their distal surfaces 162 abut one another. From this position, the top and bottom joint connector segments 152, 154 can be positioned away from one another in an extended joint position (shown in FIG. 8) in which their proximal surfaces 164 abut the pin heads 172, 174. The collapsed and extended joint positions define a range of connector sliding positions within which the top and bottom joint connector segments 152, 154 can be translated relative to one another. It should be noted that in any position of the range of connector sliding positions, the top and bottom joint connector segments 152, 154 can be pivoted about the joint pivot axis 170 relative to one another.

In FIG. 7, the window frame assembly 100 is shown in a collapsed configuration. In the collapsed configuration, the top and bottom joint connector segments 152, 154 are in the collapsed joint position, and the linking frame segment end 146 and the door frame segment end 118 are in a corresponding collapsed frame position in which they are the closest to one another.

Figure 8:
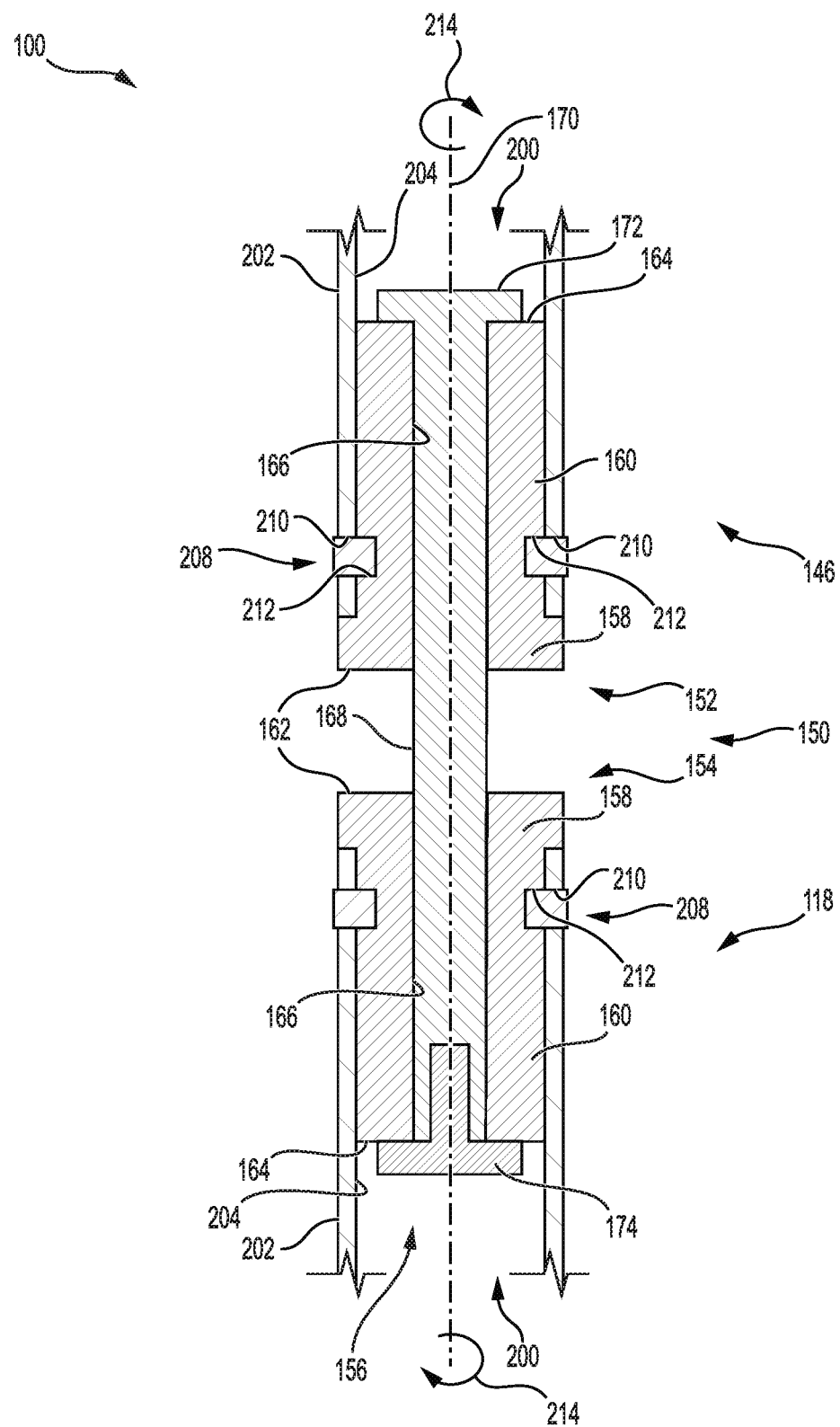
FIG. 8 is the cross-sectional view of the portions of the window frame assembly of FIG. 7 shown in an extended frame configuration.

Now with reference to FIG. 8, the window frame assembly 100 is shown in an extended configuration. In the extended configuration, the top and bottom joint connector segments 152, 154 are in the extended position, and the second linking frame segment end 146 and the first door frame segment end 118 are in a corresponding extended frame position in which they are the farthest from one another.

The collapsed frame position and the extended frame position define a range of frame sliding positions within which the linking frame segment end 146 and the door frame segment end 118 can be translated, with their respective joint connector segments 152, 154, relative to one another. It will be appreciated that in the any position of the range of frame sliding positions, the linking frame segment end 146 can be pivoted (as indicated by arrows 214) about the joint pivot axis 170 relative to the door frame segment end 118.

In other embodiments, the joint connector 150, the linking frame segment end 146 and the door frame segment end 118 are structured such that the linking frame segment end 146 and the door frame segment end 118 abut one another in the collapsed frame position. In some such embodiments, the top and bottom joint connector segments 152, 154 are integral with the second linking frame segment end 146 and to the door frame segment end 118 respectively. It is also contemplated that in an alternative embodiment, one of the linking frame segment end 146 and the door frame segment end 118 could be received inside the other one of the linking frame segment end 146 and the door frame segment end 118, so as to be slidable and pivotable therein.

Referring back to FIGS. 4 and 5, it should be noted that the pivot axis 142 is disposed rearward of hinge axis 94. As the door 52 is opened, the door 52 pivots about the hinge axis 94 with the door frame segment 108 and the linking frame segment 110 relative to the vehicle frame 18 and the cage frame segment 106. This causes the window panel 104 to bend rearward of the hinged end 82 of the door 52 as the door frame segment 108 and the linking frame segment 110 are moved.

Also, it should be noted that the pivot axis 142 is also offset laterally inwardly (not shown in detail) relative to the hinge axis 94. Furthermore, the pivot axis 142 is angled relative to the hinge axis 94. As axes 142 and 94 are not coaxial, torsion is induced in the window frame 102 as the door 52 is pivoted about the hinge axis 94 toward the open position, in part due to the linking frame segment 110 being pivoted at its end 146 about the hinge axis 94 with the door 52 relative to the vehicle frame 18 and about the pivot axis 142 at its first end 118 relative to the roll cage 42. As shown in FIG. 5, the torsion causes the linking frame segment end 146 to be pivoted about the joint pivot axis 170 relative to the door frame segment end 118. It is contemplated that the torsion could also cause the linking frame segment end 146 to be translated along the joint pivot axis 170 away from the door frame segment end 118. Stress is induced in the linking frame segment 110 and the door frame segment 108 as the torsion occurs in the window frame 102. The joint connector 150 permits movement between the linking frame segment 110 and the door frame segment 108 so as to at least partially relieve the stress. Also, torsion is induced in the window panel 104 as the door 52 is pivoted about the hinge axis 94 toward the open position, causing the window panel 104 to warp. It is contemplated that the sleeve of the window panel 104 can frictionally engage the linking frame segment 110 and the door frame segment 108 as the window panel 104 is warped, causing the linking frame segment 110 and the door frame segment 108 to move relative to one another via the joint connector 150. Further, movement via the joint connector 150 can also occur as a result of an external load being imparted to the window panel 104, for example a passenger leaning against the window panel 104 or wind blowing against the window panel 104.

It is contemplated that the window frame assembly 100 could be provided as a window frame assembly kit, including the cage frame segment 106, the door frame segment 108 (including the support 122, the brackets 124, 126, the bracket fasteners and the R-pin 136), the linking frame segment 110 (including its fasteners, not shown), the joint connector 150 and the window panel 104. Installation of the window frame assembly kit on the SSV 110 can be performed by first assembling the window frame 102 relative to the door 52 and to the roll cage 42. The mounting begins by, in no particular order, connecting the cage frame member 106 to the roll cage 42 via the clamp 42F, connecting the door frame member to the linking frame member via the joint connector 150, or fastening the brackets 124, 126 to the inner side 82 of the door 52. The door frame segment 108 may then be connected to the door 52 by inserting the transverse support segments 130 through the channels 132 of either brackets 124, 126. Next, engaging the R-pin 136 with the front transverse support segment 130 via its opening 134 retains the door frame segment 108 with the joint connector 150 and the linking frame segment 110 relative to the door 52. Then, connecting the linking frame segment 110 to the cage frame segment 106 (via their respective pivotable connectors 140, 116) and to the roll cage 42 (via the bracket 114) completes the assembly of the window frame 102. With the door 52 open, the window panel 104 can be connected to the window frame 102 by disposing portions of the window frame 102 inside the sleeve via the openings of the inner panel portion 104C. Closing the openings such that the portions of the window frame 102 are retained in the sleeve completes the installation of the window frame assembly kit. It is contemplated that the window frame assembly kit could not include the window panel 104 where the kit is intended to replace the window frame of an existing window assembly where the original window panel would be retained. Finally, it should be noted that removal of the door 52 from the SSV 10 is not a prerequisite to any of the aforementioned installation steps. Understandably, disconnecting the window panel 104 from the window frame 102 and disassembling the window frame 102 can be done by performing the aforementioned steps in reverse, and will not be described for brevity.

Figure 9:
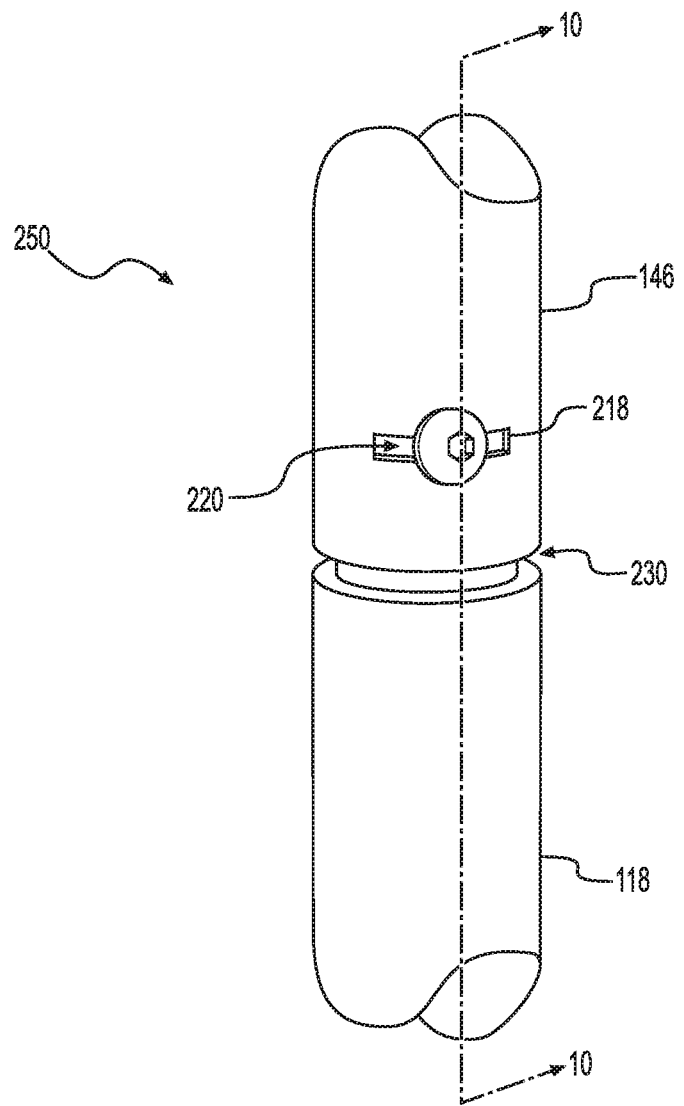
FIG. 9 is a close-up, left side elevation view of a portion of another embodiment of a window frame assembly.
Figure 10:
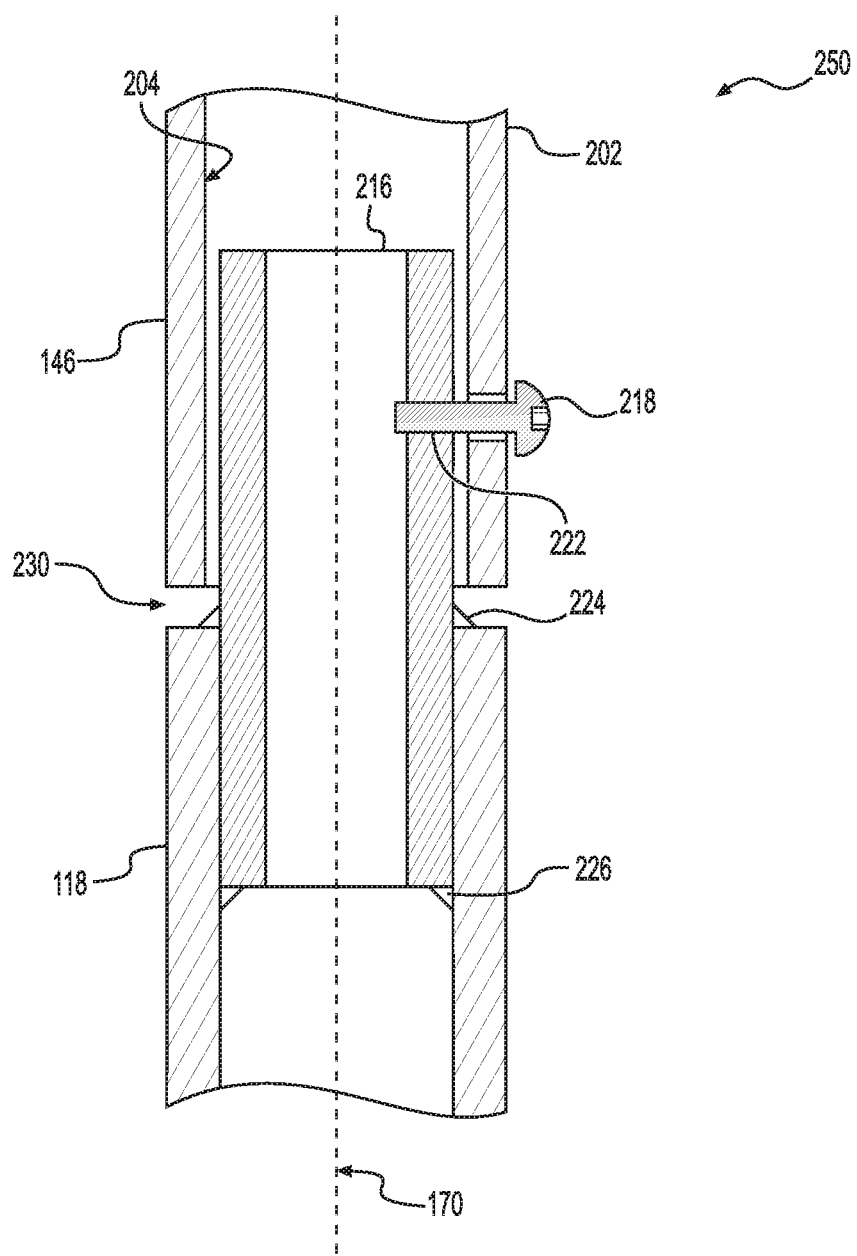
FIG. 10 is a cross-sectional view of the portion of the window frame assembly of FIG. 9, taken along line 10-10 of FIG. 9.

Another embodiment of a window frame assembly 250 will now be described with reference to FIGS. 9 and 10. Elements of the window frame assembly 250 that are similar to those of the window frame assembly 100 retain the same reference numeral and will generally not be described again.

In the window frame assembly 250, the linking frame segment 146 and the door frame segment end 118 are coupled using an inner tube 216, a screw 218 and a slot 220. There is a gap 230 between the linking frame segment 146 and the door frame segment end 118, through which the inner tube 216 extends.

The inner tube 216 has an exterior weld 224 on the door frame segment 118. The inner tube 216 is connected the door frame segment end 118 by glue, schematically illustrated by ring 226. Due to the weld 224 and glue 226, the inner tube 216 is rotationally and translationally fixed such that it cannot move relative to the door frame segment end 118.

The inner tube 216 has a clearance fit with the cylindrical inner walls 204 of the linking frame segment 146. It is contemplated that the inner tube 216 could have a different type of fitting, depending on the embodiment. The linking frame segment 146 defines the slot 220 therein. The slot 220 extends generally perpendicular to the axis 170, although it is contemplated that the slot 220 could extend partially in an other direction. The inner tube 216 defines a threaded hole 222. The screw 218 passes through the slot 220 and is rigidly coupled to the inner tube 216 by the threaded hole 222. One end of the slot 220 corresponds to the open position of the door 52. The other end of the slot 220 corresponds to the closed position of the door 52. It is contemplated that the slot 220 could have a greater or lesser extent than the illustrated embodiment. In such a configuration, the linking frame segment 146 is free to pivot about the joint pivot axis 170 relative to the door frame segment end 118 and the inner tube 216, while being constrained by the slot 220 and the screw 218 when it reaches either end of the slot 220.

In some embodiments, it is contemplated the inner tube 216 could be a solid shaft. In some embodiments, the inner tube 216 could be connected to the door frame segment end 118 through other means than welding or glue, such that the inner tube 216 is immovable with respect to the door frame segment end 118. In other embodiments, the inner tube 216 could be coupled to the linking frame segment 146 by various types of different fasteners such as, but not limited to, a bolt. It is also contemplated that in an alternative embodiment, the roles of the linking frame segment 146 and the door frame segment end 118 could be reversed, such that the linking frame segment 146 is welded to the inner tube 216, and that the door frame segment end 118 defines the slot 220.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A window frame assembly for a vehicle comprising:
   a cage frame segment adapted for connection to a roll cage of the vehicle, the cage frame segment having a first cage frame segment end and a second cage frame segment end opposite the first cage frame segment end;
   a door frame segment adapted for connection to a door of the vehicle, the door having a hinged end and an opening end opposite the hinged end, the door frame segment having:
      a first door frame segment end; and
      a second door frame segment end opposite the first door frame segment end,
      the door frame segment being adapted for connection to the door such that the first door frame segment end is disposed proximate the opening end of the door and the second door frame segment end is disposed proximate the hinged end of the door; and
   a linking frame segment having:
      a first linking frame segment end pivotable relative to the second cage frame segment end about a pivot axis for pivoting the linking frame segment and the door frame segment relative to the cage frame segment; and
      a second linking frame segment end opposite the first linking frame segment end,
      the second linking frame segment end being movably connected to the first door frame segment end such that the second linking frame segment end moves relative to the first door frame segment end as the linking frame segment and the door frame segment pivot about the pivot axis,
   the cage frame segment, the door frame segment and the linking frame segment together forming a window frame of the window frame assembly.

2. The window frame assembly of claim 1, wherein the first linking frame segment end is pivotally connected to the second cage frame segment end about the pivot axis.

3. The window frame assembly of claim 2, further comprising a window panel connected to the window frame.

4. The window frame assembly of claim 3, wherein the window panel has:
   a central panel portion disposed on an outer side of the window frame; and
   a peripheral panel portion disposed at least in part around the central panel portion, the peripheral panel portion connecting the window panel to the window frame.

5. The window frame assembly of claim 1, wherein:
   the pivot axis is a first pivot axis; and
   the second linking frame segment end is pivotally connected to the first door frame segment end about a second pivot axis such that the linking frame segment pivots relative to the door frame segment about the second pivot axis as the linking frame segment and the door frame segment pivot about the first pivot axis.

6. The window frame assembly of claim 5, further comprising a joint connector pivotally connecting the second linking frame segment end to the first door frame segment end, the joint connector defining the second pivot axis.

7. The window frame assembly of claim 5, wherein the second linking frame segment end is slidably connected to the first door frame segment end such that the linking frame segment slides along the second pivot axis relative to the door frame segment as the linking frame segment and the door frame segment pivot about the first pivot axis.

8. The window frame assembly of claim 4, wherein:
   the peripheral panel portion forms a sleeve; and
   at least one of the door frame segment, the cage frame segment and the linking frame segment is received in the sleeve for connecting the window panel to the window frame.

9. The window frame assembly of claim 1, wherein:
   the cage frame segment is generally C-shaped;
   the door frame segment is generally L-shaped; and
   the linking frame segment is generally L-shaped.

10. The window frame assembly of claim 1, wherein:
    the cage frame segment defines a first vertical portion of the window frame;
    the door frame segment defines at least in part a lower portion of the window frame;
    the linking frame segment defines at least in part an upper portion of the window frame;
    the linking frame segment and the door frame segment define at least in part a second vertical portion of the window frame, the second vertical portion of the window frame being opposite the first vertical portion of the window frame; and
    a connection between the second linking frame segment end and the first door frame segment end is in the second vertical portion of the window frame.

11. The window frame assembly of claim 1, further comprising a support connected to the door frame segment for selectively connecting the window frame assembly to the door.

12. The window frame assembly of claim 1, wherein the second door frame segment end moves relative to the first cage frame segment end as the door frame segment pivots about the pivot axis, the second door frame segment end being spaced from the first cage frame segment end.

13. A door assembly for a vehicle comprising:
a door adapted for connection to a frame of the vehicle, the door having a hinged end for hingedly connecting the door to the frame of the vehicle and an opening end opposite the hinged end;
a cage frame segment adapted for connection to a roll cage of the vehicle, the roll cage being connected to the frame, the cage frame segment having a first cage frame segment end and a second cage frame segment end opposite the first cage frame segment end;
a door frame segment connected to the door, the door frame segment having:
a first door frame segment end; and
a second door frame segment end opposite the first door frame segment end,
the door frame segment being disposed relative to the door such that the first door frame segment end is disposed proximate the opening end of the door and the second door frame segment end is disposed proximate the hinged end of the door;
a linking frame segment having:
a first linking frame segment end pivotable relative to the second cage frame segment end about a pivot axis for pivoting the linking frame segment and the door frame segment relative to the cage frame segment; and
a second linking frame segment end opposite the first linking frame segment end,
the second linking frame segment end being movably connected to the first door frame segment end such that the second linking frame segment end moves relative to the first door frame segment end as the linking frame segment and the door frame segment pivot about the pivot axis,
the cage frame segment, the door frame segment and the linking frame segment together forming a window frame; and
a window panel connected to the window frame.

14. The door assembly of claim 13, wherein the first linking frame segment end is pivotally connected to the second cage frame segment end about the pivot axis.

15. The door assembly of claim 13, wherein:
the pivot axis is a first pivot axis; and
the second linking frame segment end is pivotally connected to the first door frame segment end about a second pivot axis such that the linking frame segment pivots relative to the door frame segment about the second pivot axis as the linking frame segment and the door frame segment pivot about the first pivot axis.

16. The door assembly of claim 15, wherein the second linking frame segment end is slidably connected to the first door frame segment end such that the linking frame segment slides along the second pivot axis relative to the door frame segment as the linking frame segment and the door frame segment pivot about the first pivot axis.

17. A window frame assembly kit for a vehicle comprising:
a cage frame segment;
a door frame segment; and
a linking frame segment,
the linking frame segment being connectable to the cage frame segment and to the door frame segment for forming a window frame,
the cage frame segment having:
a first cage frame segment end; and
a second cage frame segment end opposite the first cage frame segment end,
the cage frame segment being adapted for connection to a roll cage of the vehicle;
the door frame segment having:
a first door frame segment end; and
a second door frame segment end opposite the first door frame segment end,
the door frame segment being adapted for connection to a door of the vehicle, the door having a hinged end and an opening end opposite the hinged end, such that the first door frame segment end is disposed proximate the opening end of the door and the second door frame segment end is disposed proximate the hinged end of the door;
a linking frame segment having:
a first linking frame segment end pivotable relative to the second cage frame segment end about a pivot axis for pivoting the linking frame segment relative to the cage frame segment; and
a second linking frame segment end opposite the first linking frame segment end, the second linking frame segment end being movably connectable to the first door frame segment end such that the second linking frame segment end is movable relative to the first door frame segment end;
wherein pivotally connecting the first linking frame segment end to the second cage frame segment end and connecting the second linking frame segment end to the first door frame segment end forms the window frame.

18. The window frame assembly kit of claim 17, wherein the first linking frame segment end is pivotally connectable to the second cage frame segment end about the pivot axis.

19. The window frame assembly kit of claim 17, further comprising a window panel connectable to the window frame.

20. The window frame assembly kit of claim 17, further comprising a joint connector defining the pivot axis, the joint connector being adapted for pivotally connecting the second linking frame segment end to the first door frame segment end such that the linking frame segment is pivotable about the pivot axis relative to the door frame segment.

21. The window frame assembly kit of claim 17, further comprising a support connectable to the door frame segment for selectively connecting the window frame to the door.

22. A vehicle comprising:
a frame;
a roll cage connected to the frame;
a door having a hinged end and an opening end opposite the hinged end, the hinged end being pivotally connected to the frame for pivoting the door about a hinge axis relative to the frame and to the roll cage;
a cage frame segment connected to the roll cage, the cage frame segment having a first cage frame segment end and a second cage frame segment end opposite the first cage frame segment end;
a door frame segment connected to the door, the door frame segment having:
a first door frame segment end; and a second door frame segment end opposite the first door frame segment end, the door frame segment being disposed relative to the door such that the first door frame segment end is disposed proximate the opening end of the door and the second door frame segment end is disposed proximate the hinged end of the door, the door frame segment being disposed on a first side of a laterally extending plane defined by the hinge axis, the cage frame segment being disposed at least in part on a second side of the laterally extending plane, the second side being opposite the first side;

a linking frame segment having:

a first linking frame segment end pivotable relative to the second cage frame segment end about a pivot axis for pivoting the linking frame segment and the door frame segment relative to the cage frame segment as the door pivots about the hinge axis, the pivot axis being offset from the hinge axis; and a second linking frame segment end opposite the first linking frame segment end, the second linking frame segment end being movably connected to the first door frame segment end such that the second linking frame segment end moves relative to the first door frame segment end as the linking frame segment and the door frame segment pivot about the pivot axis as the door pivots about the hinge axis, the cage frame segment, the door frame segment and the linking frame segment together forming a window frame; and a window panel connected to the window frame.

23. The vehicle of claim 22, wherein the first linking frame segment end is pivotally connected to the second cage frame segment end about the pivot axis.

\* \* \* \* \*